April 22, 1941.    R. GOMEZ    2,238,897
ELECTROLYTIC FISHING
Filed Oct. 31, 1938
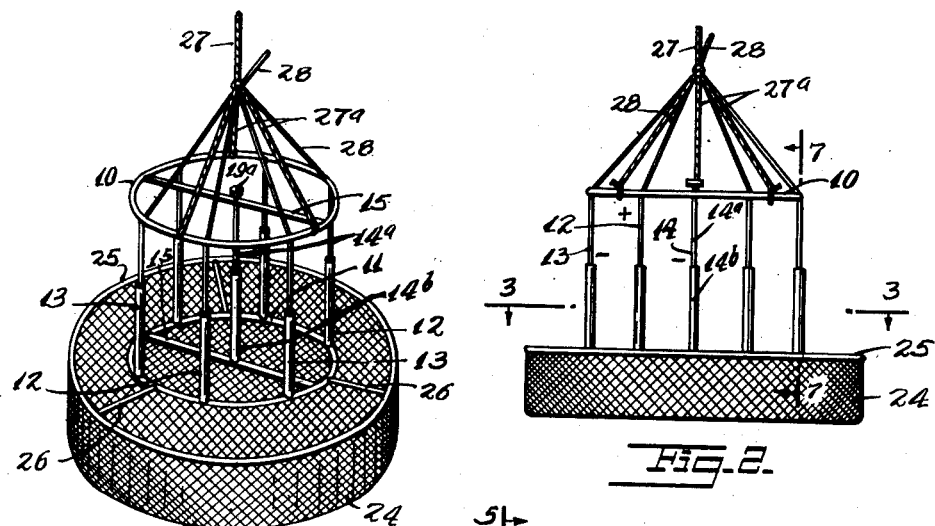
INVENTOR
Ramon Gomez
BY
ATTORNEY Patented Apr. 22, 1941

2,238,897

UNITED STATES PATENT OFFICE 2,238,897

ELECTROLYTIC FISHING

Ramon Gomez, Halifax, Nova Scotia, Canada, assignor to Ramon Perech, New York, N. Y.

Application October 31, 1938, Serial No. 237,930

3 Claims. (Cl. 43—4)

This invention relates to new and useful improvements in an electrolytic device.

By means of experiments as to the influence of an electric current on fish, it has been ascertained that in a field of a constant electric current fish are moving along its lines in the direction from the negative pole to the positive pole (from the cathode to the anode).

During these experiments it was possible to direct sardines, as well as herrings, and accumulate them in masses at the anode.

The device used in these experiments consists of two hoops or squares and between them are stretched electrodes in wire of a given polarity, and between the centers, electrodes of the opposite polarity. The current runs through an insulated conductor from the generator to the electrodes. Beneath the lower hoops a net is placed.

When the device is dipped into water and the current is switched on, an electric field is formed in the interior and around the device. The fish that are within the field at the moment the current is switched on, move towards the anodes, where they gather in dense swarms. If the anode is shifted or moved upwards, the fish swarm follows it.

The property of a constant electric current to direct fish from the cathode to the anode, and to gather them around the latter, forms the principle of a most radical method of bolting in fish in an electric field, instead of the present expensive and difficult methods of keeping fish in nets. In every case the important thing is to see to it that the current circulating between the electrodes brings about such a difference of potential, such an electric gradient that the fish are kept in the depth of the bay and do not approach the outlet.

According to this invention, the method consists in setting up, in bays teeming with fish, floating batteries of cathodes and anodes. When the current is switched on, this system brings about an electric field within which the whole mass of fish that have penetrated into it, are bolted in. Such electric bolting in, has been carried out in various experimental electrical fields.

The experiments have shown that by reducing the power of the variable resistance, one can obtain definite differences of potential, with a very reduced expenditure of electric energy.

It has been further ascertained that with a power of kilowatt, it is possible to obtain differences of potential equal to those that are brought about with a power of several kilowatts. For an electric bolting in of 100 to 150 meters, a power of about 20 kilowatts would be necessary.

As it has been proved by the experiments, it is necessary to obtain, at a distance of several meters from the cathode, a difference of potential, or electric gradient, of 2 to 5 millivolt per centimeter. The graphite electrodes are spherical. The tension between them attains 40 v. The distance between the cathodes is 10 meters in width and depth.

More specifically, the invention proposes the construction of a fishing device characterized by the provision of a pair of vertically spaced hoops or squares with a plurality of anodes and cathodes supported between the hoops or squares.

Still further it is proposed to provide a basket or net supported and extended below the bottom hoop and extending beyond the sides thereof for catching the fish as the device is raised from the water.

Still further it is proposed to form the anodes and the cathodes of separate sections telescopically connected together and to provide a means for urging these sections apart and a means for holding them in various fixed positions so that the operative length thereof may be controlled by adjusting the position of said sections.

For further comprehension of the invention, and of the objects and advantages thereof, reference will be had to the following description and accompanying drawing, it being understood that the latter are for purposes of illustration only and are not intended as a definition of the invention. For this latter purpose reference will be had to the appended claims.

In the accompanying drawing forming a material part of this disclosure:

Fig. 1 is a perspective view of an electrolytic fishing device constructed according to this invention.

Fig. 2 is a side elevational view of Fig. 1.

Fig. 3 is a sectional view on the line 3—3 of Fig. 2 showing the net in plan view.

Fig. 4 is an elevational view of the center cathode.

Fig. 5 is a sectional view on the line 5—5 of Fig. 4.

Fig. 6 is a sectional view on the line 6—6 of Fig. 5.

Fig. 7 is a sectional view on the line 7—7 of Fig. 2.

Fig. 8 is a schematic wiring diagram of the device.

Fig. 9 is a similar view to Fig. 3 but showing another shape of the invention.

Fig. 10 is a diagrammatical view showing the bolting in arrangement for fish in a bay.

The electrolytic device, according to this invention, comprising a pair of vertically spaced hoops 10 and 11. The hoops 10 and 11 have the same diameter and are arranged one above the other. A plurality of anodes 12 and cathodes 13 are supported between the hoops 10 and 11. A cathode 14 is supported axially between the hoops 10 and 11 upon support bars 15.

A means is provided for controlling the operative length of the cathodes and anodes hereinafter referred to as electrodes. Each of the electrodes is formed of separate sections one of which is fixedly attached to the hoop 10 and other of which is fixedly attached to the hoop 11 with the ends thereof in alignment. The upper sections of the electrodes are provided at their bottom ends with outwardly extended flanges 16 which slidably engage into the bottom sections of electrodes. The bottom section is formed at its upper end with an inwardly extending flange 17 which cooperates with the flange 16 for preventing the upper section from becoming accidentally disengaged from the bottom section. A spring 18 of the expansion type is located within each of the bottom sections of the electrodes and operates between the bottom thereof and the bottom face of the flange 16 for urging the upper sections into their extended positions with relation to the bottom sections. This movement of the upper sections causes the hoops 10 and 11 to be moved away from each other.

A means is provided for holding the sections forming each of the cathodes at various fixed positions. This means is associated with the center cathode 14 which is supported axially of the center of the hoops 10 and 11. This cathode is also formed of separate sections 14a and 14b. The upper section 14a is slidably engaged into the bottom section 14b. The upper section has a shaft 19 turnably engaged therethrough and which extends from the top thereof and is provided with a handle 19a. The shaft 19 near its bottom end is formed with an outwardly extended peg 20 which engages through a horizontal elongated slot 21 formed near the bottom of the section 14a (see Fig. 6). This slot 21 permits the shaft 19 to be slightly turned for changing the position of the peg 20.

The bottom section 14b is provided with a bayonet slot 22 throughout its entire length and which is provided with a plurality of branches 22a into which the peg 20 may be selectively engaged for holding the sections of the electrodes in various fixed positions. A spring 23 of the expansion type operates between the bottom end of the section 14b and the bottom end of the section 14a for urging the top section 14a and the shaft 19 into a position in which the peg 20 will be located within one of the branches 22a. Each of the branches 22a is connected with the main portion of the slot 22 by means of a horizontal intermediate portion 22b extending therebetween.

A basket or net 24 is supported upon and below the bottom hoop 11 and extends past the sides thereof. The top edges of the basket or net 24 are attached to a large circular hoop 25 having a diameter greater than the bottom hoop 11 so that the bottom hoop may be positioned within the larger hoop 25. A means is provided for supporting the basket or net 24 upon the lower hoop 11 so that as the fish drop from the anodes 12 they will fall into the basket or net. This means comprises a plurality of outwardly extending brackets 26 which are attached to the outer periphery of the hoop 11 which have their outer ends attached to the inner periphery of the hoops 25. Hoisting cables 27 are provided for lowering the device into a body of water for catching the fish. At its bottom end the hoisting cable 27 branches out into a plurality of auxiliary cables 27a each of which has its free end fixedly attached to a portion of the hoop 10 for maintaining it in an upright position when extended into the body of water.

An electric circuit 28 is provided for supplying a constant current to the electrodes. One lead 28a connects all of the cathodes 13 and 14 together. A rheostat 29 is provided on one of the leads for controlling the direct current of the circuit. This rheostat 29 permits the current to be increased or decreased for making the device operative of larger area or a smaller area, depending upon requirements. If the device is positioned in an extremely large body of water, the current may be increased for spreading its effect over a larger portion of the body of water, or if the device is positioned in a smaller body of water the current may be decreased for preventing the loss of energy not needed for catching fish within the vicinity.

The operation of the device is as follows:

The device is lowered into the body of water and the current is turned on through the circuit 28 and the rheostat 29 is adjusted to meet the immediate requirements. As the current passes through the anodes and cathodes the fish in the vicinity will find that it is better to flock towards the anodes rather than remain in any other position of the water and will tend to take positions around the anodes. The anodes and cathodes are arranged in alternating positions between the hoops 10 and 11 and as the current passes therebetween it will set up a circular barrier having a diameter substantially equal to that of the hoops. Any fish located within the circumference of the outer anodes and cathodes will be prevented from escaping by a barrier of electricity passing between the alternating anodes and cathodes. After a sufficient number of fish have been drawn to the device they may be raised from the water, and when the surface is reached the fish positioned around the anodes and cathodes will fall into the basket 24 where they will be caught.

For controlling the operative length of the anodes and cathodes the handle 19a is pressed inwards against the holding action of the spring 23 to cause the peg 20 to move along the length of the branch 22a within which it is located to a position adjacent the intermediate portion 22b to permit the shaft 19 to be rotated to align the peg 20 with the body of the bayonet slot 22. In this position the length of the anodes and cathodes may be changed by pressing inwards to shorten them or release them to permit the springs 18 and 23 to extend the top sections thereof to the desired position. When the desired position is again reached the handle 19 is rotated to cause the peg 20 to move along the adjacent intermediate portion 22b to align the peg with the respective branch 22a so that when the handle 19a is released the spring 23 will urge the shaft 19 and the section 14a outwards to cause the peg 20 to be engaged into the branch 22a to hold it fixedly in position.

In Fig. 9, the reinforcing wires 11' and 25' are shown to be rectangular. Any other shaped frame and netting may also be used in connection with this invention. The nets may also be entirely eliminated if so desired.

In Fig. 10 the bay 30 is provided with a plurality of anode units 12 and cathode units 13 for setting up a field of constant electric current for the bolted in fish, in the bay 30.

While I have illustrated and described the preferred embodiments of my invention, it is to be understood that I do not limit myself to the precise constructions herein disclosed and the right is reserved to all changes and modifications coming within the scope of the invention as defined in the appended claims.

As shown, cathode units 13 are located across bay 30 adjacent the mouth or outlet thereof and anode units 12 are preferably positioned in the bay in lines parallel to said cathodes, adjacent the bight of said bay. The flow of current from cathode to anode creates an electric field throughout substantially the entire bay and fish are confined therein being unable to escape therefrom because of the electrical barrier created by the cathodes at the outlet. Furthermore, because of the direction of current flow the fish are caused to swim to and mass around anodes 12 at the bight end of the bay where said fish may be conveniently caught by any of the well-known methods. It will be understood that this novel method may be utilized to trap fish in any partially enclosed body of water, i. e., a body of water enclosed on substantially three sides thereof and having a mouth or outlet opening to some other body of water.

I claim:

1. The method of fishing wherein electrolytic means are utilized which consists in lowering electrodes into a body of water containing fish, energizing said electrodes to cause a constant current to flow therebetween, keeping said electrodes submerged until a quantity of fish is attracted to the anode, and raising said electrodes to the surface of the body of water thus causing the fish to swim therewith to the surface.

2. An electrolytic fishing device, comprising a pair of vertically spaced frames, a plurality of anodes and cathodes supported between said frames, means for supplying a constant electric current to said electrodes including a rheostat for controlling said current, each of said anodes and said cathodes being formed from separate sections telescopically connected together, resilient means for urging said sections apart, and means for holding the sections at various fixed positions.

3. In an electrolytic fishing device, a plurality of anodes and cathodes, each of said anodes and said cathodes being formed from separate sections telescopically connected together, means for urging said sections apart, and means for holding the sections at various fixed positions, said last-named means comprising a member pivotally mounted in one of said sections, said member having a peg radially extending therefrom and adapted to selectively engage one of a plurality of slots in the other of said sections.

RAMON GOMEZ.